(12) United States Patent
Romack et al.

(10) Patent No.: US 6,506,259 B1
(45) Date of Patent: *Jan. 14, 2003

(54) CARBON DIOXIDE CLEANING AND SEPARATION SYSTEMS

(75) Inventors: Timothy J. Romack, Greenville, NC (US); James B. McClain, Raleigh, NC (US); Gina M. Stewart, Durham, NC (US); Ramone D. Givens, Durham, NC (US)

(73) Assignee: Micell Technologies, Inc., Raleigh, NC (US)

( * ) Notice: Subject to any disclaimer, the term of this patent is extended or adjusted under 35 U.S.C. 154(b) by 40 days.

This patent is subject to a terminal disclaimer.

(21) Appl. No.: 09/718,020

(22) Filed: Nov. 20, 2000

Related U.S. Application Data

(63) Continuation-in-part of application No. 09/632,686, filed on Aug. 7, 2000, now Pat. No. 6,200,393, which is a continuation of application No. 09/070,196, filed on Apr. 30, 1998, now Pat. No. 6,120,613.

(51) Int. Cl.[7] .......................... B08B 7/04; B01D 11/04; B01D 12/00
(52) U.S. Cl. .......................... 134/10; 134/11; 134/13; 134/26; 210/634; 210/636; 210/638
(58) Field of Search .......................... 134/10, 11, 13, 134/26; 210/634, 646, 638

(56) References Cited

U.S. PATENT DOCUMENTS

| | | | |
|---|---|---|---|
| 4,923,720 A | 5/1990 | Lee et al. | 427/422 |
| 5,013,366 A | 5/1991 | Jackson et al. | 134/1 |
| 5,267,455 A | 12/1993 | Dewees et al. | 68/5 C |
| 5,279,615 A | 1/1994 | Mitchell et al. | 8/142 |
| 5,356,538 A | 10/1994 | Wai et al. | 210/634 |
| 5,370,742 A | 12/1994 | Mitchell et al. | 134/10 |
| 5,377,705 A | 1/1995 | Smith, Jr. et al. | 134/95.3 |
| 5,412,958 A | 5/1995 | Iliff et al. | 68/5 C |
| 5,415,897 A | 5/1995 | Chang et al. | 427/421 |
| 5,431,843 A | 7/1995 | Mitchell et al. | 252/186.38 |
| 5,486,212 A | 1/1996 | Mitchell et al. | 8/142 |
| 5,669,251 A | 9/1997 | Townsend et al. | 68/58 |
| 5,676,705 A | 10/1997 | Jureller et al. | 8/142 |
| 5,679,737 A | 10/1997 | DeSimone et al. | 524/529 |
| 5,688,879 A | 11/1997 | DeSimone et al. | 526/89 |
| 5,824,726 A | 10/1998 | DeSimone et al. | 524/424 |
| 5,858,022 A * | 1/1999 | Romack et al. | 8/142 |
| 5,866,005 A | 2/1999 | DeSimone et al. | 210/634 |
| 6,120,613 A * | 9/2000 | Romack et al. | 134/10 |
| 6,200,393 B1 * | 3/2001 | Romack et al. | 134/10 |

FOREIGN PATENT DOCUMENTS

| | | | |
|---|---|---|---|
| EP | 0 518 653 A1 | 6/1992 | D06L/1/02 |
| WO | WO 96/27704 | 9/1996 | |
| WO | WO 97/16264 | 5/1997 | |

OTHER PUBLICATIONS

D.A. Canelas et al.; *Dispersion Polymerization of Styrene in Supercritical Carbon Dioxide: Importance of Effective Surfactants*, Macromolecules, 29/8:2818–2821 (1996).

Manfred Wentz; *Textile Cleaning with Carbon Dioxide?*; Copyright © 1995 By R.R. Street & Co. Inc.

PCT International Search Report for PCT/US 99/07248, dated Jul. 6, 1999.

* cited by examiner

Primary Examiner—Zeinab El-Arini
(74) Attorney, Agent, or Firm—Myers Bigel Sibley & Sajovec

(57) ABSTRACT

A separation method includes (a) providing a heterogeneous separation system, the heterogeneous cleaning system comprising $CO_2$ in a first phase and an oil in a separate second phase; (b) entraining a material to be separated in the second phase; (c) wholly or partially solubilizing the second phase in the first phase to produce a separation system in which said material to be separated is insoluble; and then (d) separating the material from the system. The separating step is preferably followed by the step of (e) recovering at least a portion of the oil. The system is useful in a variety of applications, including cleaning (particularly metal cleaning), polymerization, extraction, coating, and particle formation and treatment.

27 Claims, 1 Drawing Sheet

CARBON DIOXIDE CLEANING AND SEPARATION SYSTEMS

RELATED APPLICATIONS

This application is a continuation-in-part of commonly owned, application Ser. No. 09/632,686, filed Aug. 7, 2000, now issued as U.S. Pat. No. 6,200,393, which is a continuation of Ser. No. 09/070,196, filed Apr. 30, 1998, now issued as U.S. Pat. No. 6,120,613, the disclosures of both of which are incorporated by reference herein in their entirety.

FIELD OF THE INVENTION

This invention relates to cleaning and separation methods useful in cleaning substrates, particularly metal substrates, and useful for polymerization processes, coatings, extractions, and the manufacture and treatment of particles.

BACKGROUND OF THE INVENTION

The cleaning of contaminants from workpieces is an important step in many manufacturing processes. Unfortunately, many processes employ environmentally undesirable solvents, or are high temperature processes that are energy intensive. For example, vapor degreasing techniques employ both volatile organic solvents and high temperatures. Efforts to replace such processes with aqueous systems are not entirely satisfactory because of the problem of contacting water to substrates that may be oxidized thereby, and by the problem of cleaning the contaminated water. In addition, the drying of aqueous systems is very energy intensive.

Vegetable oils such as soybean oil and modified soybean oil have been suggested for cleaning, but have not received significant use because of either their high cost or the difficulty in removing or extracting residual components of the oil.

$CO_2$-based cleaning methods have been suggested. Some employ supercritical $CO_2$, which (due to the need to handle higher temperatures and/or pressures) increases the cost of the apparatus used to carry out the processes. U.S. Pat. No. 5,377,705 to Smith et al. describes a precision cleaning system in which a variety of different co-solvents may be included (see column 8, lines 19–24 therein), with the mixture of the carbon dioxide and the co-solvent being either homogenous or heterogenous (see column 6, lines 4–11 therein). A problem with this system that it still does not provide a means to separate the contaminant from the co-solvent (see column 7, lines 24–32).

Accordingly, an object of the present invention is to provide a carbon-dioxide based cleaning system incorporating a separate cleaner, in which the contaminants may be separated from the cleaner to facilitate subsequent re-use or disposal of the cleaner.

A second object of the invention is to provide oil-based separation systems in which the oil, such as a vegetable oil, may be recovered for subsequent reuse.

SUMMARY OF THE INVENTION

A separation method comprises (a) providing a heterogeneous separation system, the heterogeneous cleaning system comprising $CO_2$ in a first phase and an oil in a separate second phase; (b) entraining a material to be separated in the second phase; (c) solubilizing the second phase, in whole or in part, in the first phase to produce a separation system in which said material to be separated is insoluble; and then (d) separating the material from the system. The separating step is preferably followed by the step of (e) recovering the oil (i.e., some or all of the oil), so that it may be re-used in or recycled to step (a) above. Each of the steps may be carried out with or without agitation.

An advantage of the invention is that the separation system is phase-tunable, in that the material of the second phase can alternately be rendered soluble, in whole or in part, or insoluble in the first phase, alternately rendering the material to be separated soluble or insoluble in the system in a controllable manner. Thus the system is a homogeneous system in one embodiment, when the second phase is wholly solubilized in the first phase to render the material to be separated insoluble therein.

The system is useful in a variety of applications, including cleaning, polymerization, extraction, coating, and particle formation and treatment. The system is particularly advantageous where the oil employed is of a relatively high cost. Since environmentally acceptable solvents such as organic or vegetable oils (including synthetic oils) can be relatively expensive, this system enables the use of such products in a broader variety of applications, in a cost-effective manner.

As noted above, one particular aspect of the invention is a method of cleaning a contaminant from a substrate. The method comprises contacting a substrate with a heterogeneous cleaning system. The heterogeneous cleaning system comprising $CO_2$ in a first phase and a cleaner (preferably an oil such as an organic, or vegetable, oil) in a separate second phase, so that contaminant carried by said substrate is entrained in the cleaner. The cleaner is then wholly or partially solubilized in the first phase (e.g., by increasing the pressure of the system) to produce a cleaning system in which the contaminant is immiscible (e.g., a homogeneous cleaning system), and that contaminant is separated from the substrate. The substrate is separated from the cleaning system, either before or after the solubilizing step, and the contaminant (which has been rendered immiscible in the cleaning system) is separated from the cleaner. The cleaning system advantageously can be implemented as a non-aqueous system, thereby reducing drying times and problems with oxidation.

The foregoing and other objects and aspects of the present invention are explained in detail below.

DETAILED DESCRIPTION OF THE INVENTION

Figure 1:
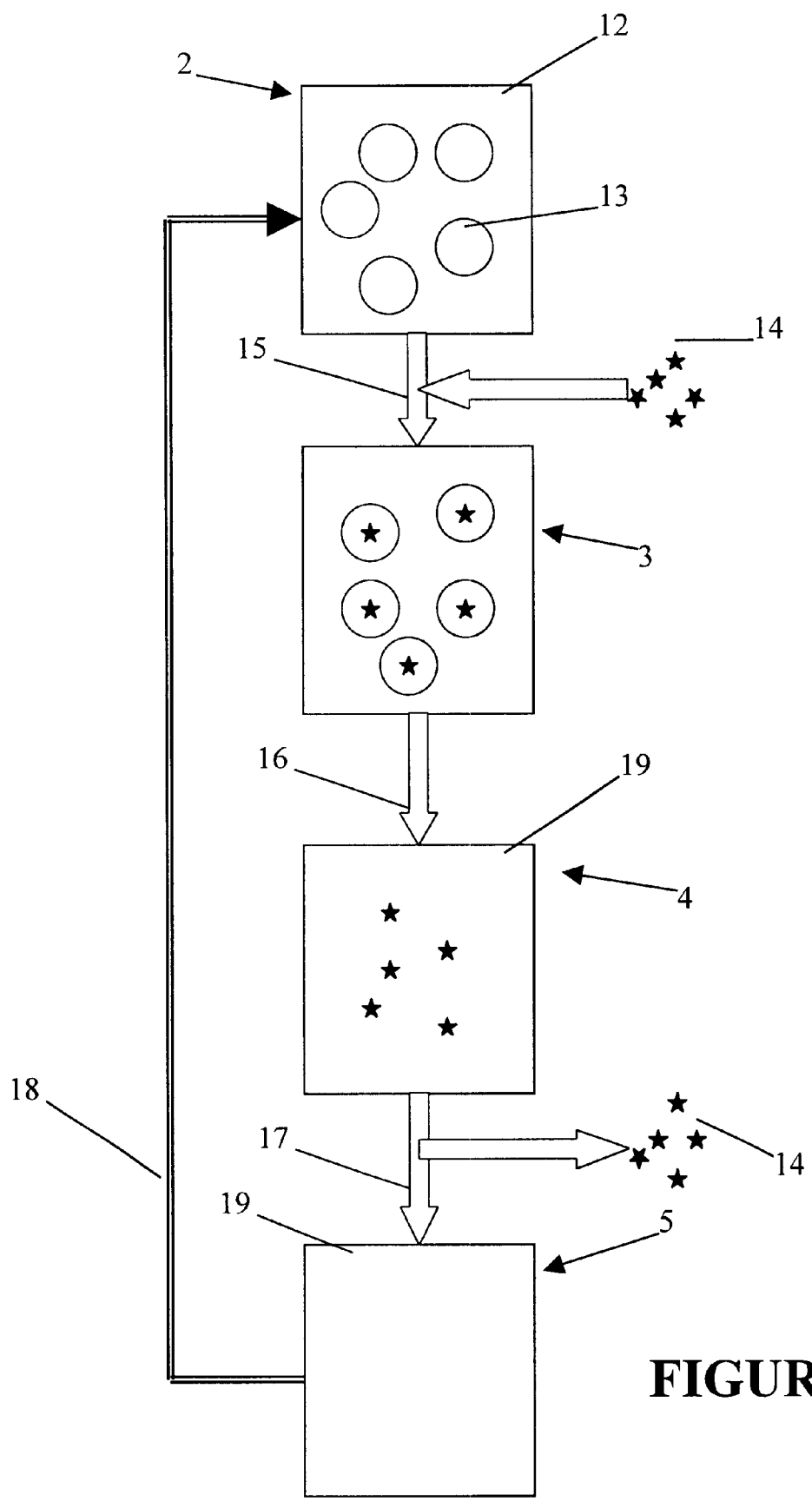
FIG. 1 is a schematic diagram of a process of the invention, in which the phase-tunable system is represented by boxes 2, 3, 4 and 5 at different steps in the process.

A $CO_2$-based cleaning and separation system is disclosed herein. The system includes a material that may be alternately rendered miscible or immiscible in the carbon dioxide. Hence, the system is referred to as a "phase-tunable" system in that one phase may alternately be rendered soluble or insoluble in the other, carbon dioxide-containing, phase.

Suitable materials that may alternately be rendered soluble or insoluble in the carbon dioxide-containing phase are, in general, oils such as esters of fatty acids (including methyl, ethyl, propyl, and butyl esters, etc.) mineral oils (including paraffinic and/or naphthenic petroleum distillates), aliphatic hydrocarbons, polyethyleneglycols, polypropylene glycols, polyisobutylenes, poly alpha olefins, saturated and unsaturated carboxylic (fatty) acids, lard, tallow, triglycerides, vegetable oils (including soy, corn, sunflower, safflower, olive, canola, corn, almond, and walnut oils, and modified derivatives thereof, particularly SOYSOLV®, etc.), and fatty acids, fatty alcohols, fatty amines, and modifications thereof including fatty esters, fatty ethers, and fatty amides.

Additional examples of suitable oils include, but are not limited to, methyl soyates such as Oleocal® ME-130 (Lambert Technologies), Carolube® Soy (Chemol Company Inc.), Vikoflex® 7010 (Elf Atochem), Soygold® 1000 and Soygold® 2000 (AG Environmental Products), MESOY® (Chemol Company Inc.), AGSOY ME® (AG Environmental Products); vegetable oils such as Capital®, Factice®, Lipex®, Polytung®, Pureco®, StaBland®, and Vikoflex®; and, generally, rapeseed oil (canola oil), linseed oil, lanolin oils and fish oils. Classifications of suitable oils include, but are not limited to, methyl linoleates, linolenic methyl esters, linoleic methyl esters, epoxidized oils, and oleates.

In general, the first phase comprises carbon dioxide, and the second phase comprises a material that may alternately be rendered soluble or insoluble in carbon dioxide as described above. Typically, the first phase is the continuous phase and the second phase is the dispersed phase, and both phases are liquid phases. Additional phases or materials can be added where desired or permitted. For example, a substrate to be cleaned or a substrate on which material is to be deposited can be added to the system, an aqueous phase could be incorporated itself into the second oil phase (e.g., the oil phase itself could be an emulsion or microemulsion), etc.

A schematic overview of the method of the invention is shown in FIG. 1, which shows a separation method, comprising providing a heterogeneous separation system 2, the heterogeneous cleaning system comprising $CO_2$ in a first phase 12 and a separate second phase 13. In the next step 15, a material to be separated 14 is entrained in the second phase. In the next step 16, the second phase is solubilized in the $CO_2$ to produce a homogeneous separation system 19 in which said material 14 to be separated is insoluble or immiscible (note that some material may remain soluble or slightly soluble in the separation system, as long as a sufficient portion of the material to be separated is rendered insoluble, to achieve the desired separation). In step 17, the insoluble material is then separated from the system, and in step 18 the system is recycled to re-form the heterogeneous system (e.g., by decreasing pressure) to thereby recover the oil. The method is typically carried out in a closed vessel to permit maintenance and control of the pressure in a suitable manner. While step 16 of FIG. 1 illustrates a homogeneous system, note that not all of the second phase must be solubilized into the first phase, so long as a sufficient amount is solubilized into the first phase to render an effective portion of material to be separated insoluble in, and separable from, the system.

In a cleaning process, the material to be separated is carried into the system on a substrate, and that material is then entrained or solubilized into the second phase.

In a polymerization process, the material to be separated is a polymer. The entraining step is carried out by adding a monomer to the system; and then polymerizing the monomer in the second phase. The polymer may be either soluble or insoluble in the second phase.

In an extraction process, the process is simply carried out by extracting the material to be separated into the second phase as the separation step.

In a coating or treatment process, the separating step is carried out by depositing the material on a substrate and then separating the substrate from the system. The depositing step can be carried out in a manner that forms a coating on the surface of the substrate (e.g., with a solid substrate such as a metal or glass), or can be carried out in a manner so that the material impregnates the substrate (e.g., polymer particles or beads).

In a particle manufacture process, the separating step is carried out by forming particles comprising said material during said solubilizing step, and then collecting the particles from the system. This process may advantageously be combined with the polymerization process discussed above.

The recovering step is carried out by any suitable means. For example, the recovering step may be carried out by separating the oil from the carbon dioxide to provide a heterogeneous separation system; and then recycling the heterogeneous separation system to the initial "providing" step as illustrated by line 18 in FIG. 1. Alternatively, the recovering step may be carried out by physically separating the oil from the carbon dioxide (e.g., by venting the carbon dioxide from the vessel in which the system is contained, and then optionally draining the oil, or a concentrated oil and carbon dioxide mixture, from the vessel).

Where the instant invention is carried out to apply or incorporate a material or other additive to a substrate from the second phase (see coating and treatment methods below), after the recovery step a portion of the additive is regained. Make-up and maintenance of a desired charge of ingredient can occur by several routes:

1) Metering of the make-up fluid into a low pressure area of the system. The low pressure area is the Cleaning/Treatment Chamber (where materials and substrates must be put in and out of the system. This can be affected by many means: (a) A blocked off segment of pipe that is isolated from the chamber and substrate but will be flushed by the incoming process fluid (process fluid could also be circulated during the cycle, then the additional ingredient could be brought into the system at any time during the cycle—this is important if one desires to incorporate any kind of pre-treatment at a lower concentration) (b) Placed directly into the chamber before, during of after the addition of a substrate. (c) Metering pump pulling from a low pressure reservoir to the high pressure point in the system. The high pressure point can be anywhere.

2) By fractionation of the contaminant/extract. For example in a metal cleaning application, little or no oil need to be added over. Loses would be recovered by using the fraction of the contaminant with the same solubility characteristics as the original active ingredient. Note that the composition of the oil could change over time without adversely affecting the operation of the system.

Specific embodiments of the invention are discussed in greater detail below.

1. Cleaning Methods

Contaminants to be cleaned are miscible in the cleaner when the cleaner is immiscible in carbon dioxide but immiscible in the cleaner when the cleaner is miscible in carbon dioxide. The solvating characteristics of the cleaner makes possible both the cleaning of the contaminant from the substrate and the separation of the contaminant from the cleaner. The cleaner may then be re-used, either in combination with the $CO_2$ in the original cleaning system or by separating the cleaner from the $CO_2$. Alternatively, the cleaner may be disposed of without the problem of substantial amounts of contaminants entrained therein.

$CO_2$ used to carry out the present invention is preferably liquid $CO_2$, particularly during the step of contacting the cleaning system to the substrate.

Cleaners that may be used in the present invention are, in general, cleaners that are immiscible in $CO_2$, at the temperature, pressure and concentrations, in which the cleaning step is carried out. The cleaner is, however, selected so that it may be rendered soluble in $CO_2$ by manipulating the temperature, pressure, and/or concentration thereof (i.e., by raising one, or both, of temperature and pressure; by increasing $CO_2$ volume, etc.). The cleaner is typically an oil as described above.

Cleaning systems of the present invention (that is, systems used during the cleaning step) are mixtures of $CO_2$, typically liquid $CO_2$, and the second phase (the $CO_2$-immiscible cleaner). The mixture may be in any suitable form, including suspensions, dispersions, and emulsions (including microemulsions). Preferably the $CO_2$ is the continuous phase and the immiscible cleaner is the disperse phase in the system, but in an alternate embodiment the $CO_2$ may be the disperse phase and the immiscible cleaner may be the continuous phase. In either case, the two phases are rendered miscible during the separation step, as discussed in greater detail below. The cleaning systems are preferably non-aqueous. The second phase comprises from about 1, 2 or 3 percent to about 40, 50, or 60 percent by volume of the cleaning system.

The $CO_2$-containing phase may optionally include a co-solvent. Any co-solvent may be employed that is miscible in $CO_2$ under the conditions of the process. Examples of suitable co-solvents include, but are not limited to, methanol, ethanol, methyl ethyl ketone, acetone, and alcohols. Where a co-solvent is included, it may be included in any suitable amount, typically from about 1, 2 or 3 to about 20, 30, or 40 percent by volume of the first phase.

Contaminants that may be cleaned by the present invention include hydrocarbons, particularly hydrocarbons that are insoluble in liquid $CO_2$. Examples of such contaminants are quench oils such as FERROCOTE™, honey oils, cutting oils, heat transfer oils, etc. Such hyrocarbons may or may not be halogenated, and include numerous paraffins. Other contaminants include fingerprints, dust, residuals, grit, grime, adhesives, coatings such as paint, varnish, films, rust, scale and corrosion, etc.

Substrates that may be cleaned by the method of the present invention include metals such as steel, copper, and aluminum. The substrate may be in any form, including small parts such as screws, nuts, aircraft components, radiator channels and elbows, etc.

Additional substrates to be cleaned include plastics, ceramics, wood, glass and fiberglass and combinations thereof, such as textiles (e.g., gloves and rags for decontamination). The substrate may be an item to be restored or recycled such as an item having a painted surface, etc.

In general, the instant method initially involves contacting a substrate with a heterogeneous cleaning system. The contacting step is typically carried out in an enclosed pressure vessel (a cleaning vessel), and is carried out at a pressure and temperature and concentrations of $CO_2$ and cleaner such that the heterogeneous cleaning system comprises $CO_2$ in a first phase and the cleaner in a separate second phase. The contacting step is carried out for a time sufficient for contaminant carried by said substrate to be entrained, in whole or in part, in the cleaner.

Liquid conditions are preferred because of the ease of separating the contacting fluid from the substrate. This is a function of temperature and pressure as described in the literature (e.g., A New Equation of State for Carbon Dioxide Covering the Fluid Region from the Triple-Point Temperature to 1100 Kelvin at Pressures up to 800 Mpa, R. Span, W Wagner; J. Phys. Chem. Ref. Data Vol 25, No. 6, 1996 and references therein)

Also useful in carrying out the invention are "denisfied phases" of $CO_2$. These are: (1) any state of 'compressed liquid', typically at a pressure above the saturation pressure and all temperatures below the critical point, Pmax=500 bar, (2) supercritical, or near-critical state which are temperatures above the critical point, Tmax=150° C. and pressures such that the density of the fluid is greater than the critical density, rmin=0.4 g/cc, Pmax=500 bar.

In general, all densities above 0.4 g/cc and pressures less than 500 bar in the fluid regions (fluid=supercritical, near-critical and liquid), are useful in carrying out the present invention.

The step of solubilizing the cleaner in the $CO_2$ to produce a homogeneous cleaning system in which the contaminant is immiscible may be carried out in the same vessel or a different vessel from the contacting step, depending on the particular form of the apparatus used to carry out the method. Solubilizing of the cleaner in the $CO_2$ may be carried out by any suitable means, including manipulating temperature, pressure, concentration of $CO_2$, and combinations thereof. For example, the pressure of the system could be increased, the temperature could be increased, or the concentration of $CO_2$ could be decreased (e.g., by partial venting of the $CO_2$). As with the contacting step, the system is preferably a liquid system during the solubilizing step. Whether carried out in the same vessel as the contacting step or a separate vessel, the contaminant is separated from the substrate (e.g., by proper positioning of the substrates within a basket in the contacting vessel so that the contaminant rises or settles to a different location therein).

After the contacting step, the substrate is preferably rinsed with $CO_2$ before it is removed from the vessel. Rinsing may be accomplished by any means. The vessel may be drained of the cleaning system and a separate $CO_2$ rinse solution (which may or may not contain co-solvents) passed into the vessel. Alternatively, the rinsing may be carried out with the cleaning solution itself after it has been rendered homogeneous. In the latter case, the cleaning solution may again be rendered homogeneous in either the same or a different pressure vessel in which the contacting step is carried out, depending on the particular form of the apparatus employed.

As will be apparent from the foregoing, the substrate can be separated from the cleaning system either before or after the solubilizing step. For example, if the cleaning system is drained from the cleaning vessel and the two phases then rendered miscible in a separate vessel, the substrate is thereby separated from the cleaning system before the solubilizing step. If the two phases are rendered miscible within the reaction vessel (and the system then used as a rinse solution), the substrate will be separated from the cleaning system after the solubilizing step (e.g., by subsequent draining of the system or venting of the carbon dioxide).

Separation of the contaminant from the cleaner may be carried out in a variety of ways. The cleaning system may be transferred from the cleaning vessel to a separate vessel, the two phases rendered miscible, and the immiscible contaminant separated therein by any suitable means, such as filtering, sedimentation, distillation, etc.

Materials and methods employed in carrying out cleaning methods as described herein may be applied in like manner to the methods described below.

2. Polymerization Methods

In a polymerization process, the material to be separated is a polymer and the entraining step is carried out by adding a monomer to the system; and then polymerizing the monomer in the second phase. Any suitable polymerization process may be employed, and monomers and initiators may be located in any suitable compartment of the system. The reaction may be carried out with other polymers dissolved or dispersed in any suitable compartment of the system.

Temperatures, pressures, and other processing steps employed in carrying out these techniques may be essentially the same as described in conjunction with cleaning methods above, as modified by the requirements of the specific process.

3. Extraction Methods

In an extraction process, a single component or multiple components to be retained or removed are separated from a liquid or solid mixture. In the present invention, the extraction process is simply carried out by extracting the material to be separated into the second phase as the separation step. The invention is particularly advantageous in extracting material from a mixture comprising biological materials or biomass (e.g., a microbiological fermentation broth, vascular plant material such as leaves, needles, stems, roots, and bark, etc.), or in separating a constituent from the product mixture of an organic reaction or biochemical reaction.

Temperatures, pressures, and other processing steps employed in carrying out these techniques may be essentially the same as described in conjunction with cleaning methods above, as modified by the requirements of the specific process.

4. Coating and Treatment Methods

As noted above, in a coating or treatment process, the separating step is carried out by depositing the material on a substrate and then separating the substrate from the system. The depositing step can be carried out in a manner that forms a coating on the surface of the substrate (e.g., with a solid substrate such as a metal or glass part, or a drug particle), or can be carried out in a manner so that the material impregnates the substrate (e.g., polymer, metal, or clay or zeolite particles or beads). Fibers, including natural fibers (e.g., cotton, wool) and synthetic or polymer fibers (e.g., poly(ethylene terephthalate)), can be treated or impregnated with materials by this method.

Particles and fibers may be coated with materials such as biopolymers (e.g., polypeptides, oligonucleotides), fluoropolymers, organic compounds, fire retardants, biocides, plasticizing agents, colorants or dyes, etc. to impart drugs, pharmaceutical agents, modify toxicity, add dyes and colorants, modify surfaces (including modification of hydrophobicity/hydrophilicity, roughness or surface texture, uniformity, spherocity, packing density, adhesive properties, etc.

Drug particles used to carry out the present invention are typically solid particulate drugs (optionally in combination with a pharmaceutically acceptable carrier such as lactose). Drug particles for inhalation use are, in general, respirable particles, typically from about 0.1 or 0.5 to 5 or 10 microns in size. The present invention is particularly useful for coating such drug particles with polymers or other materials that inhibit aggregation in a propellant so that the particles may subsequently be used in a metered dose inhaler. Examples of drugs from which respirable particles may be formed include, but are not limited to, peptides, oligonucleotides (including natural and synthetic), and organic compounds such as epinephrine hydrochloride or bitartrate, ergotamine tartrate, albuterol, metaproterenol sulfate, beclomethasone dipropionate, flunisolide hemihydrate, cromolyn sodium, nedocromil sodium, iptropium bromide, salmeterol xinafoate, triamcinolone acetonide, pirbuterol acetate, bitolterol mesylate, dexamethasone sodium phosphate, terbutaline sulfate, nitroglycerin, budesonide, etc.

Temperatures, pressures, and other processing steps employed in carrying out these techniques may be essentially the same as described in conjunction with cleaning methods above, as modified by the requirements of the specific process.

5. Particle Manufacture Methods

In a particle manufacture process, the separating step is carried out by forming particles comprising said material during said solubilizing step, and then collecting the particles from the system. This process may advantageously be combined with the polymerization process discussed above. Thus, particles may be formed from a polymer (latex, dispersion, emulsion products, drug delivery particles, particles for use in aerosol formulations or photocopy toner). In general, as the process progresses, particle formation occurs as the carbon dioxide solubilizes the oil phase. Control of the size of the dispersed oil phase advantageously enables control of the size of the particles formed.

Temperatures, pressures, and other processing steps employed in carrying out these techniques may be essentially the same as described in conjunction with cleaning methods above, as modified by the requirements of the specific process.

The present invention is explained in greater detail in the following non-limiting examples.

EXAMPLE 1

Cleaning of a Screw Machine Part

Carbon steel machined nuts (200 g) coated with a heat quench oil (13 g) are added to a 1.6-L pressure-rated vessel at room temperature. SOYSOLV® (80 mL), an immiscible soybean oil obtained from Steyer Farms, Inc. (6154 N. Co. Rd. 33, Tiffin, Ohio, 44883 USA), is added and the vessel is filled with $CO_2$ to liquid half full (~700 mL at 850–875 psia). The parts are rotated at 5–10 RPM inside a mesh cage while the wash fluid is circulating and emulsified by a pump for 5 minutes. The wash fluid is then drained and the vessel is refilled with $CO_2$ to 1000–1500 psia. The rinse liquid is circulated for 5 minutes and then drained. After the residual pressure is vented, the parts are removed from the vessel. No quench oil remains on the parts by visual inspection, and wiping the parts on a white sheet of paper leaves no residue.

In a separate chamber, the wash fluid is subjected to 1600 psig, solubilizing the SOYSOLV® oil in the $CO_2$ phase and allowing separation of a substantial portion of the heat quench oil contaminant from the system.

EXAMPLE 2

Cleaning of Screw Machine Part

Carbon steel machined nuts (2.89 g) coated with a heat quench oil (0.01–0.05 g) are added to a 10-mL pressure-rated vessel at room temperature. An immiscible hydrocarbon solvent, 1.0 mL Isopar V, available from the Exxon Company, is added and the vessel is filled with $CO_2$ to liquid half full (~5.0 mL at 850–875 psia). The wash fluid is stirred via a magnetically coupled stir bar for 5 minutes. The wash fluid is then drained and the vessel is refilled with $CO_2$ to 1000–1500 psia. The rinse liquid is circulated for 5 minutes and then drained. After the residual pressure is vented, the parts are removed from the vessel. A major portion of the contaminant is removed from the parts as determined by visual inspection, and wiping the parts on a white sheet of paper leaves a slight residue.

In a separate chamber, the wash fluid is subjected to 1600 psig, solubilizing the SOYSOLV® in the $CO_2$ phase and allowing separation of a substantial portion of the heat quench oil contaminant from the system.

EXAMPLE 3

Demonstration of "Oil" Solubilization Step

A 50:50 volume mixture of a heat quench oil and SOYSOLVOG oil (8.5 g) is added to a 160-mL pressure rated vessel at room temperature. Liquid $CO_2$ (80 mL) at 850–875 psia is introduced into the vessel. The vessel contents separate into two liquid layers, and the bottom layer is drained from the vessel. This 4.70 g fraction is predominantly heat quench oil. The vessel is then depressurized by distillation of $CO_2$. The remaining 3.63 g of oil is predominantly SOYSOLV® oil.

EXAMPLE 4

Polymerization of Acrylamide and Isolation of Polymer

A mixture of $CO_2$ (80 vol %) and SOYSOLV® oil (20 vol %) is maintained at 50° C. under pressure conditions where two phases (one primarily soy and the other primarily $CO_2$) are present. The soy phase is dispersed in the $CO_2$ continuous phase through agitation. A mixture of acrylamide monomer and 2,2-bisazobutyronitiile (AIBN) dissolved in acetone is metered into the reactor. Acrylamide is largely insoluble in $CO_2$, and partitions into the soy phase. Once polymerization is complete, the pressure is increased until the soy phase becomes soluble in $CO_2$. The soy/$CO_2$ solvent system is then displaced with $CO_2$ at sufficient pressure to dissolve the soy product. The pressure is released and solid polyacrylamide recovered from the reactor.

EXAMPLE 5

Polymerization of Styrene and Isolation of Polymer

A 25° C. mixture of SOYSOLV® oil (20%) and $CO_2$ (80%) is prepared in a well circulated polymerization reactor at 850 psig. The heterogeneous mixture consists of small droplets of soysolv dispersed in a continuous phase of $CO_2$. Diisopropyl peroxy dicarbonate, a room temperature free radical polymerization initiator and styrene monomer are simultaneously metered into the reactor. As polystyrene, which is insoluble in $CO_2$ and soluble in SOYSOLV® oil, is formed, it is entrained in the dispersed droplets of the oil. Once the polymerization reaction is complete, pressure is increased to 2500 psig (by adding additional $CO_2$), solubilizing the soy and allowing isolation of polystyrene. The homogeneous mixture of soy and $CO_2$ is removed from the reactor, the pressure is vented, and polystyrene is isolated.

EXAMPLE 6

Natural Product Extraction

A natural product is extracted from organic matter using a heterogeneous mixture of SOYSOLV® OIL and $CO_2$. The natural product is soluble in Soysolv® oil and relatively insoluble in $CO_2$. The heterogeneous extraction fluid is then pumped into a higher pressure zone where the SOYSOLV® oil is soluble in $CO_2$ and the desired natural product is precipitated into the solution of SOYSOLV® OIL and $CO_2$. The fine suspension of natural product is then isolated in a cyclone separator.

EXAMPLE 7

Coating of a Metal Part

Metal screw machine parts are placed in a high-pressure chamber containing polystyrene dissolved in SOYSOLV® oil. The parts are rotated at a low speed through the liquid as $CO_2$ is added to the vessel. The liquid heterogeneous mixture so formed in the vessel consists of a predominantely $CO_2$ continuous phase and a dispersed phase of SOYSOLV® oil and polystyrene. As more $CO_2$ is added, the SOYSOLV® oil is extracted into the continuous phase, leaving the polystyrene coated on the parts. The $CO_2$/SOYSOLV® oil homogeneous liquid is then drained from the vessel, and the parts are rinsed with fresh $CO_2$. After the vessel is vented, the metal parts, coated with polystyrene, are removed.

EXAMPLE 8

Coating/Impregnation of Preformed Particles

Preformed particles of respirable drug particles are placed into a chamber. The chamber is pressurized to the vapor pressure of $CO_2$ and a heterogeneous mixture of SOYSOLV® oil and $CO_2$, the soy oil phase containing lecithin, is pumped into the chamber with mixing. The pressure is raised to ca. 2500 psi, solubilizing the soy product in the $CO_2$ and depositing the lecithin on the drug particles. The soy oil/$CO_2$ solvent mixture is then removed by flushing with pure $CO_2$. The remaining $CO_2$ is vented, the chamber opened, and lecithin coated drug particles recovered for use.

EXAMPLE 9

Fiber Coating

Poly(ethylene teraphthalate) (or "PET") fiber is processed in a high pressure chamber containing a heterogeneous liquid mixture of acrylic copolymer dissolved in SOYSOLV® soy oil dispersed phase, suspended in a $CO_2$ continuous phase. As the pressure is raised by adding more $CO_2$, the soy oil dissolves into the $CO_2$ phase, precipitating the acrylic copolymer onto the PET fiber. The solution of $CO_2$ and soy oil is then replaced with pure $CO_2$ which is removed and the acrylic coated PET fiber is recovered.

EXAMPLE 10

Production of PEEK Particles

Poly(ether ether ketone) (or "PEEK") and liquid diphenyl sulphone as the oil are added to a vessel containing $CO_2$. Under the conditions employed the mixture forms a heterogeneous mixture of two liquids: a solution of PEEK dissolved in diphenyl sulphone, dispersed in a $CO_2$ continuous phase. The $CO_2$ pressure and temperature are raised to a point where diphenyl sulfone is soluble in $CO_2$ precipitating PEEK as particles.

EXAMPLE 11

Production of Polystyrene Particles

Polystyrene is dissolved into the oil phase of a pre-made oil-in-$CO_2$ suspension. The pressure of the $CO_2$ is increased, solubilizing the oil, precipitating polystyrene as particles. The polystyrene particles are isolated in a cyclone separator and the solution of oil and $CO_2$ recycled to a lower pressure where it again forms two phases and can be used to dissolve more polystyrene.

EXAMPLE 12

Cereal Crop Seeds Coating

The cereal crop seeds are introduced into one end of a continuous countercurrent process and flushed with $CO_2$ to remove dust and prepare the seed surface to accept the dressing materials. The mixture of $CO_2$ and dust is removed from the opposite end and filtered. The seeds are then transferred to a batch pressure vessel and a mixture of $CO_2$ in a first phase and oil in a separate dispersed second phase is introduced into the process. The seeds can be mixed in either the $CO_2$ in the first phase or in the second/dispersed oil phase or exist as a separate solid phase. The $CO_2$ causes the seeds to swell and allows the dressing material to permeate the outer surface of the seed. A plurality of desired dressing materials such as aqueous pesticides, herbicides, fungicides, nutrients, and hormones are entrained in the second/dispersed oil phase. A coating material or binder, which can be a natural or a synthetic polymer, is also entrained in the second/dispersed oil phase. An alternative is to entrain a monomer in the dispersed droplets of oil and introduce an initiator into the first/$CO_2$ phase either prior to or subsequent to solubilizing the oil into the first/$CO_2$ phase.

The pressure of the system is increased causing the oil to solubilize within the first/$CO_2$ phase. With the controlled collapse of the oil droplets the dressing materials and the binder precipitate onto the seeds forming a thin uniform coating. Once the dispersed oil is solubilized within the $CO_2$ phase, a curing agent can then be introduced into the system and could consist of an initiator, UV light, or any other suitable curing agent depending on the nature of the binder. This curing of the binder can be performed either as a separate step of as part of the same process.

EXAMPLE 13

Edible Wrap Coating

The invention may be used to provide an edible wrap coating like a Cling-Wrap® coating. A food substrate such as poultry, beef, fish, vegetable, fruit, or nut is treated with a non-polar organic to kill the bacteria and then coated with a air impermeable membrane to increase the shelf life and decrease the natural decomposition rate of the product. A food product is introduced into a pressure chamber containing a heterogeneous mixture of soy oil (e.g., methyl soyate oil such as SOYSOLV®)oil and $CO_2$. A mixture of Non-polar organics and a polar coating material such as ethyl cellulose are entrained within the soy oil. The mixture of soy oil and $CO_2$ is agitated to insure full coverage of the food product with the coating material. The pressure of the chamber is increased to solubilize the soy oil within the $CO_2$ and precipitate the non-polar organics and ethyl cellulose onto the outer surfaces of the food product. The non-polar organics serve to kill bacteria while the ethyl cellulose seals the food product and reduces exposure of the food to outside air. The soy oil and $CO_2$ are then pumped from the chamber and the food product removed.

EXAMPLE 14

Drug Coating

Drug particles are placed inside of a pressure vessel containing a heterogeneous mixture of $CO_2$ and soy oil. A plurality of aqueous based coating materials such a ethyl cellulose, hydroxypropyl methylcellulose, hydroxypropyl cellulose, and povidone along with a plasticizer are emulsed within the soy oil droplets. The pressure of the coating vessel is then increased in a stepped manner such that increased amounts of $CO_2$ becomes dissolved in the soy oil and an increased portion of the soy becomes dissolved within the $CO_2$ phase. This drives two functions of forcing the coating materials to precipitate onto the drug particles: (1) The $CO_2$ functions as an antisolvent in a Gas Antisolvent Recrystallization (GAS) process decreasing the ability of the oil to entrain the coating materials. (2) The $CO_2$ dissolves increasing fractions of the dispersed oil. This will effectively concentrate the coating materials in the decreasing dispersed phase. At some point this will lead to precipitation of the coating materials and deposition of the coatings onto the drug particles. The differing size of the coating materials within the soy oil combined with the incremental pressure increases results in different coating materials precipitating at different times. In this manner the coating materials are deposited onto the drug particles in distinct layers with each layer having differing attributes.

EXAMPLE 15

Metal Particle Coating

A metal particle is coated with an aqueous solution using a heterogeneous mixture of soy oil and $CO_2$. Metal particles such as iron, copper, tin, zinc, nickel, aluminum, or any combination thereof are fed into a pressure chamber. A polar coating material such as, ethyl cellulose, starch, an enzyme, a scent, or any combination thereof, is entrained in an emulsion with the soy oil. The mixture of soy oil and $CO_2$ is pumped into the pressure vessel and agitated to ensure coverage of the metal particles. The pressure is then increased to 2500 psi solubilizing the soy oil within the $CO_2$ and causing the polar organic to precipitate onto the metal particles. The metal particles are then isolated from the $CO_2$ and soy oil.

EXAMPLE 16

Multi-Layer Drug Particle Formation

Aqueous drug particles are formed in a pressure vessel containing a heterogeneous mixture of $CO_2$ and soy oil. A plurality of active aqueous drug compounds, along with inactive binding and filler materials, are emulsed within the soy oil droplets. Each compound is included because of its differing therapeutic benefit. The pressure of the coating vessel is then increased in a stepped manner such that increased amounts of $CO_2$ becomes dissolved in the soy oil and an increased portion of the soy becomes dissolved within the $CO_2$ phase. This drives two functions of forcing the active drug compounds to precipitate and form drug particles: (1) The $CO_2$ functions as an antisolvent in a Gas Antisolvent Recrystallization (GAS) process decreasing the ability of the oil to entrain the coating materials. (2) The $CO_2$ dissolves increasing fractions of the dispersed oil. This will effectively concentrate the active drug compounds in the decreasing dispersed phase. At some point this will lead to precipitation of the compounds and the formation of drug particles comprised of several active drug compounds. The differing size of the active compounds within the soy oil combined with the incremental pressure increases results in different compounds precipitating at different times. In this manner the active drug compounds are precipitated in a predictable order and form drug particles having distinct spherical layers. Each layer has a different therapeutic benefit. As a result of this process, the order and timing in which the different drugs are administered, can be precisely controlled.

EXAMPLE 17

Natural Products Extraction

Flavorings; scents (both pleasant and unpleasant); natural compounds for use in pesticides, herbicides, or fungicides; acids; caffeine; and other aqueous compounds are extracted from organic matter by a heterogeneous mixture of soy oil and $CO_2$. The organic matter is fed into a pressured extraction vessel. The pressure of the extraction vessel is pulsed such that the soy oil momentarily solubilizes within the $CO_2$. This pulsing of the pressure serves to tear the fibers of the organic matter and aid in the extraction of the desired compound. During this process, the aqueous compounds become emulsed within the soy oil. This heterogeneous mixture with the aqueous extractant emulsed within the soy oil is pumped out of the extraction vessel into a high-pressure vessel. The increased pressure forces the soy oil to solubilize within the $CO_2$ and allows the fine suspension of aqueous compounds to be separated in a cyclone separator. The aqueous compounds may be either the desired product or a waste compound such as an offensive odor or taste.

EXAMPLE 18

Protein and Peptide Extraction

A heterogeneous mixture of soy oil and $CO_2$ is contained in a pressure chamber. Tissue cell mass is introduced into the chamber and the chamber is agitated and pressure pulsed to further tear the fibers of the tissue cell mass. With the aid of surfactants within the soy oil, small proteins or peptides are extracted from the tissue cell mass and isolated within the soy oil. The tissue cell mass is removed from the chamber and the pressure of the chamber is increased to solubilize the soy oil within the $CO_2$. This solubizing step results in a separation of the small proteins or peptides from the soy oil. The fine suspension of proteins or peptides is then isolated in a cyclone separator.

EXAMPLE 19

Amino Acid Extraction

A blend of amino acids is separated using a heterogeneous mixture of soy oil and $CO_2$. An aqueous solution of amino acids is metered into a pressure chamber containing soy oil and $CO_2$. The mixture is agitated and the amino acids become emulsed within the soy oil phase. The pressure is slowly increased in a stepped manner. With each increase in pressure the solubility of the soy oil within the $CO_2$ increases and a different and distinct amino acid is precipitated. Each amino acid is then isolated from the heterogeneous mixture in a cyclone separator before the pressure is increase again.

EXAMPLE 20

Food Cleaning

Contaminants are flushed from the surface of a food product and bacteria killed using non-polar organics entrained in a heterogeneous mixture of soy oil and $CO_2$. A food product such as poultry, beef, fish, mutton, pork, or any tissue is placed in a pressure chamber containing a heterogeneous mixture on soy oil and $CO_2$. The mixture is agitated to aid in the removal of aqueous contaminants. The contaminants become entrained in the soy oil phase and thus isolated form the tissue or food product. Non-polar organics can also be dissolved within the soy oil to kill bacteria. The tissue is removed form the pressure chamber prior to solubilizing the soy oil within the $CO_2$. The solubilizing step causes the contaminants and organic solvents to separate and the contaminants and organic solvent are then isolated in a cyclone separator. The soy oil and $CO_2$ are once again pure and can be reused in the process.

EXAMPLE 21

MEMS Cleaning

Micro electromechanical systems (MEMS) are cleaned subsequent to the etching process to remove the masking material, silicon, quartz, glass, polysilicon, silicon nitride, dioxide, polymides, and other fine particle contaminants. A MEMS is micromachined using the RIE etching process, an anistropic or isotropic chemical etching process, LIGA (lithography, electroplating, and molding) or some other suitable machining process. Subsequent to the micromachining process, the MEMS is secured in a pressure chamber containing a heterogeneous mixture of soy oil and $CO_2$. The mixture is agitated and the fine particles of silicon, glass, etc. become entrained within the oil phase. The heterogeneous mixture is then transferred to a high-pressure vessel where the oil is solubilized within the $CO_2$ and the micromachining particles are precipitated and removed from the cleaning fluid. The oil and $CO_2$ are now clean and ready for reuse.

EXAMPLE 22

Metal Parts Cleaning

A heterogeneous mixture of soy oil and $CO_2$ is used to remove polar contaminants from metal parts. The metal parts are placed in an agitated bath where the polar contaminants become entrained within the oil phase. The heterogeneous mixture is then pumped into a high-pressure vessel and where the oil is solubilized within the $CO_2$. The contaminants are then isolated from the system in a cyclone separator.

EXAMPLE 23

Textile and Fiber Cleaning

Polar contaminants are removed from rags, gloves, hats, drop-clothes, or other fiber-based articles using a heterogeneous mixture of SOYOLV® soy oil and $CO_2$. The articles are placed in an agitated bath containing a heterogeneous mixture of soy oil and $CO_2$. After a sufficient amount of time the oil and $CO_2$ mixture is flushed from the system with pure $CO_2$ and pumped into a high-pressure vessel. The oil is solubilized and the polar contaminants are removed from the system in via a cyclone separator.

EXAMPLE 24

Continuous Aqueous Cleaning and Extraction Process

Material is fed into one end of a continuous countercurrent process. The purpose of the process can be for the cleaning or extraction of a desired or undesired substance from the material or any combination of the two. A heterogeneous mixture of $CO_2$ and soy oil is fed into the process from the opposite end. The pressure of the system is periodically pulsed such that the oil momentarily solubilizes within the $CO_2$. This pulsing of the system serves to aid in the agitation of the system and, in the case of organic matter, to tear the fibers and aid in the extraction process. The aqueous compounds become emulsed within the soy oil. Because of the decreasing pressure gradient found in the continuous countercurrent process, the pressure pulsing can be controlled such that only the soy oil at the oil/$CO_2$ feed end becomes momentarily solubilized. The oil and $CO_2$ at the exit end remains a heterogeneous mixture. This heterogeneous mixture with the aqueous contaminants and/or extractants emulsed within the oil is pumped out of the countercurrent extractor and into a high-pressure vessel. The increased pressure forces the oil to solubilize within the $CO_2$ and allows the fine suspension of aqueous compounds to be separated in a cyclone separator The aqueous compounds may be either the desired product or a waste compound such as an offensive odor or taste.

EXAMPLE 25

Continuous Aqueous Particle Formation and Synthesis Process

The purpose of the process is for the formation and synthesis of particles and the collection thereof. A heterogeneous mixture of $CO_2$ and soy oil is fed into the process from one end. An aqueous substance is entrained within the oil. Other non-aqueous substances and monomers can also be entrained within the oil. An initiator is feed into the system at a specified point and the initiator reacts with the substance at the boundary layer between the CO2 and oil. Once reacted, the substance may or may not precipitate. In the case where the substance remains entrained within the oil, the heterogeneous mixture is pumped out of the countercurrent extractor and into a high-pressure vessel. The increased pressure forces the oil to solubilize within the $CO_2$ and allows the fine suspension of aqueous substances to be separated in a cyclone separator. The aqueous compounds may be either the desired product or a waste compound such as an offensive odor or taste.

The foregoing is illustrative of the present invention, and is not to be construed as limiting thereof. The invention is defined by the following claims, with equivalents of the claims to be included therein.

That which is claimed is:

1. A method of cleaning a contaminant from a substrate, comprising the steps of:
    contacting a substrate with a heterogeneous cleaning system, the heterogeneous cleaning system comprising $CO_2$ in a first phase and a cleaner in a separate second phase, so that contaminant carried by said substrate is entrained in said cleaner; then
    solubilizing said cleaner in said first phase under pressure to produce a homogeneous cleaning system in which said contaminant is immiscible and said contaminant is separated from said substrate; and
    separating said substrate from said cleaning system before or after said solubilizing step; and
    separating said contaminant from said cleaning system;
    wherein said cleaner is an oil, and wherein said first phase is a continuous phase and said second phase is a disperse phase;
    and wherein said second phase further comprises a separate aqueous phase.

2. A method according to claim 1, wherein said step of separating said substrate from said cleaning system is carried out prior to said solubilizing step.

3. A method according to claim 1, wherein said step of separating said substrate from said cleaning system is carried out after said solubilizing step.

4. A method according to claim 1, further comprising rinsing said substrate with $CO_2$ after said contacting step.

5. A method according to claim 1, farther comprising
    rinsing said substrate in said homogeneous cleaning system after said solubilizing step; and then
    separating said substrate from said homogeneous cleaning system.

6. A method according to claim 1, further comprising:
    Separating said cleaner from said $CO_2$ following said step of separating said contaminant from said cleaning system.

7. A method according to claim 1, wherein said contaminant is insoluble in said $CO_2$ during said contacting step.

8. A method according to claim 1, wherein said contaminant is a hydrocarbon.

9. A method according to claim 1, wherein said cleaner is a vegetable oil.

10. A method according to claim 1, wherein said first phase and said second separate phase are both liquid phases.

11. A method according to claim 1, wherein said substrate is a metal substrate.

12. A method according to claim 1, wherein said solubilizing step is carried out by solubilizing substantially all of said cleaner in said first phase to produce a substantially homogeneous cleaning system in which said contaminant is insoluble.

13. A method according to claim 1, wherein said solubilizing step is carried out by increasing the pressure of said system.

14. A separation method, comprising the steps of:
    providing a heterogeneous separation system, the heterogeneous separation system comprising $CO_2$ in a first phase and an oil in a separate second phase; then
    entraining a material to be separated in said second phase; and then
    solubilizing said second phase in said first phase under pressure to produce a separation system in which said material to be separated is insoluble; and then
    separating said material from said system;
    wherein said first phase is a continuous phase and said second phase is a disperse phase;
    and wherein said second phase further comprises a separate aqueous phase.

15. A method according to claim 14, wherein said separating step is followed by:
    a recovering step comprising recovering at least a portion of said oil.

16. A method according to claim 14, wherein said material to be separated is a polymer and said entraining step is carried out by:
    adding a monomer to said system; and
    polymerizing said monomer in said second phase.

17. A method according to claim 14, wherein said entraining step is carried out by:
    extracting said material to be separated into said second phase.

18. A method according to claim 14, wherein said separating step is carried out by:
    a depositing step comprising depositing said material on a substrate having a surface; and then
    a separating step comprising separating said substrate from said system.

19. A method according to claim 18, wherein said substrate is a particle.

20. A method according to claim 18, wherein said depositing step is carried out on the surface of said substrate to form a coating on said substrate.

21. A method according to claim 14, wherein said separating step is carried out by:

forming particles comprising said material during said solubilizing step; and then collecting said particles from said system.

22. A method according to claim 14, wherein said oil is a vegetable oil.

23. A method according to claim 14, wherein said first phase and said second separate phase are both liquid phases.

24. A method according to claim 14, wherein said recovering step is carried out by:

separating said oil from said carbon dioxide to provide a heterogeneous separation system; and then recycling said heterogeneous separation system to said providing step.

25. A method according to claim 14, wherein said separating step is followed by:

a recovering step carried out by separating said oil from said carbon dioxide.

26. A method according to claim 14, wherein said solubilizing step is carried out by solubilizing substantially all of said second phase in said first phase to produce a substantially homogeneous separating system in which said material to be separated is insoluble.

27. A method according to claim 14, wherein said solubilizing step is carried out by increasing the pressure of said system.

* * * * *